Patented June 30, 1931

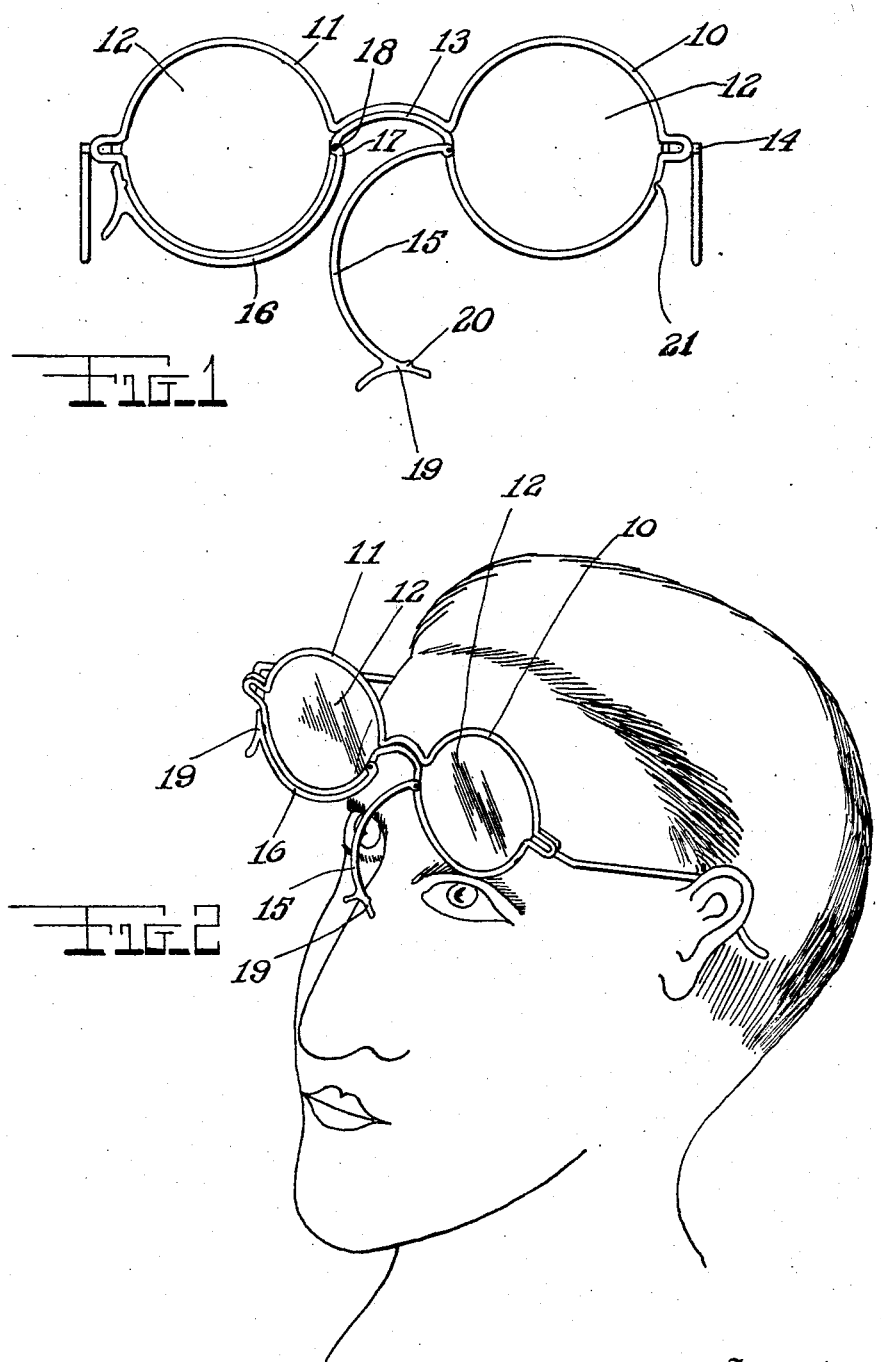

1,811,855

UNITED STATES PATENT OFFICE

HERBERT LODDE AND JOHN DIECKMANN, OF NEW YORK, N. Y.

SUPPORT FOR HOLDING SPECTACLES ABOVE THE LINE OF VISION

Application filed August 13, 1930. Serial No. 474,976.

The main object of this invention is to provide a member attached to the frame of spectacles or eyeglasses for the purpose of supporting these spectacles above the line of vision when desired.

Another object of the invention is to provide a support for holding a pair of spectacles above the line of vision which is hingedly attached to the spectacles, and may be swung to the used or unused position with facility.

The above and other objects will become apparent in the description below in which characters of reference to like-named parts in the drawings.

Referring briefly to the drawings, Figure 1 is a front elevational view of a pair of spectacles showing one of the support members in used position.

Figure 2 is a perspective view showing the application of the support.

Referring in detail to the drawings, the numerals 10 and 11 indicate the frames in which the spectacle lenses 12 are retained. These frames are mutually connected by a curved ridge 13. The spectacle frames are usually provided with pivoted arms 14 whose extremities are curved downwardly to snugly fit around a portion of the elbow of the ear.

The rings 10 and 11 in which the lenses 12 are mounted, serve as an anchor for the ends of substantially semi-circularly curved fingers 15 and 16. The ends 17 of these fingers are bifocaled, and are adapted to be pivotally attached to the lens rings 10 and 11 by pivot pins 18. These substantially semi-circular curved fingers 15 and 16 are adapted to rest upon the external arcuate surface of the rings 10 and 11 below the diametral axis, as illustrated on the left-hand side of Figure 1 when the fingers are not in use. At the free ends of these fingers 15 and 16 curved saddle members 19 are formed which are adapted to selectively rest upon the bridge of the nose of the user accordingly as which one of the fingers are to be used. One of the extensions of the saddle 19 is provided with a relatively small raised lug 20 which is adapted to register in a relatively small detent 21 of the same form as the lug when these fingers 15 and 16 lie adjacent to and in contact with the lens rings 10 and 11 and serve as a means for securing said fingers in the unused position.

The device is adapted to be attached to spectacle or eyeglass frames and is used for supporting an eyeglass frame above the plane of vision of the user when this condition is desired. Ordinarily, one of these fingers is used at a time but the spectacle frame is provided with two members, one beneath each lens ring in order to obtain symmetry of design. Either of the fingers 15 or 16 may be selectively used and is rotated from the position shown on the left-hand side of Figure 1 of the depending position illustrated in Figure 2. The saddle 19 when either of these fingers is depended, rests upon the bridge of the nose of the user, and in doing so, supports the eyglass frame in raised position above the line of vision when desired.

It is to be noted that certain changes in form and construction may be made without departing from the spirit and scope of the invention.

We claim:

1. In combination with spectacles, a pair of lens rings forming part of a frame, each lens ring having a finger pivotally secured thereto, said finger being adapted to rotate from the unused to the depending and used position, and means at the extremity of said finger for supporting said eyeglass frame upon the nose of the user in a position in which the eyeglass frame is raised above the vision of the user.

2. In combination with spectacles, means for supporting said spectacles above the line of vision, a pair of lens rings, a bridge connecting said lens rings, a substantially semi-circularly curved finger pivotally connected to said lens rings, a saddle at the free end of each of said fingers, said saddle being adapted to rest upon the nose when either of said fingers is in depending position, and means for retaining said fingers in folded position adjacent said lens rings when in unused position.

3. In combination with spectacles, means for supporting said spectacles above the line of vision, a pair of lens rings, a bridge connecting said lens rings, a substantially semi-circularly curved finger pivotally connected to said lens rings, a saddle at the free end of each of said fingers, said saddle being adapted to rest upon the nose when either of said fingers is in depending position, said rings having detents therein, said fingers having lugs thereon engaging said detents when said fingers have been rotated to the unused position.

In testimony whereof we affix our signatures.

HERBERT LODDE.
JOHN DIECKMANN.